United States Patent [19]
Simon

[11] Patent Number: 4,829,390
[45] Date of Patent: May 9, 1989

[54] ELECTRICAL SWITCH AND CIRCUITRY FOR APPLIANCE

[76] Inventor: Robert E. Simon, 5 Cumberland Cir., El Paso, Tex. 79903

[21] Appl. No.: 908,609

[22] Filed: Sep. 15, 1986

[51] Int. Cl.⁴ ............................................. H02H 3/16
[52] U.S. Cl. ......................................... 361/49; 361/91; 361/102; 361/103; 361/115; 307/326; 307/116; 340/650; 200/61.08
[58] Field of Search ............... 361/49, 50, 42, 45, 361/91, 88, 102-104, 115, 125; 340/650, 652, 590, 591; 200/61.08, 83 B, 83 R, 213; 337/401, 403, 405, 411, 309, 114; 307/326

[56] References Cited

U.S. PATENT DOCUMENTS

| | | | |
|---|---|---|---|
| 3,848,100 | 11/1974 | Kozorezov et al. | 200/61.08 |
| 3,859,482 | 1/1975 | Matsui et al. | 200/61.08 |
| 3,936,621 | 2/1976 | Palin et al. | 200/61.08 |
| 4,296,285 | 10/1981 | Lang et al. | 200/61.08 |
| 4,443,854 | 4/1984 | Pflanz et al. | 361/93 X |

Primary Examiner—Todd E. DeBoer
Attorney, Agent, or Firm—Marcus L. Bates

[57] ABSTRACT

A safety device for disconnecting an electrical appliance from a power supply, and thereby preventing electrical shock hazards. A normally closed switch connects the appliance to the power supply. A frangible device, such as a flash bulb, maintains the switch in the closed position. A sensor detects a dangerous condition and actuates the flash bulb, which action fragments the envelope of the bulb, whereupon the switch assumes the open position, thereby disconnecting the appliance from the power supply.

17 Claims, 3 Drawing Sheets

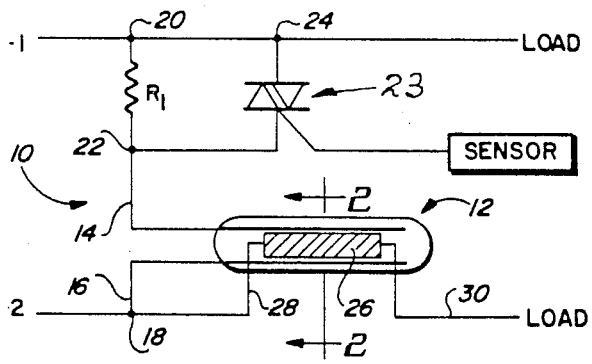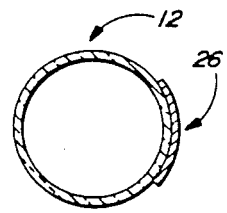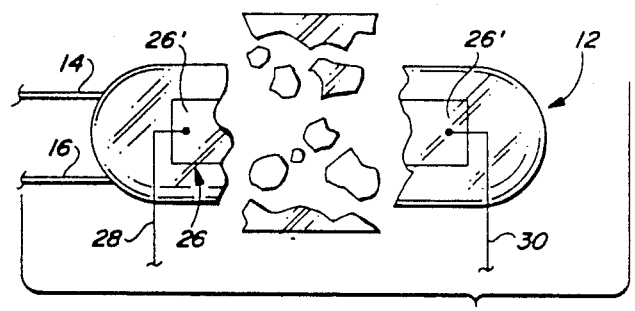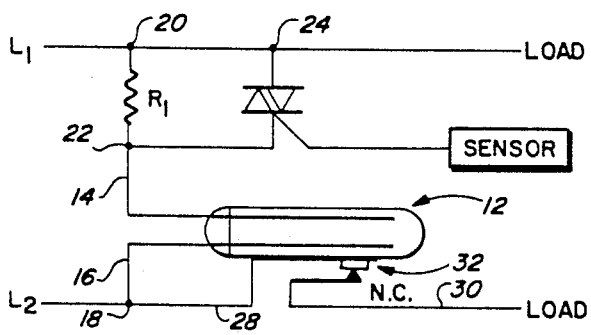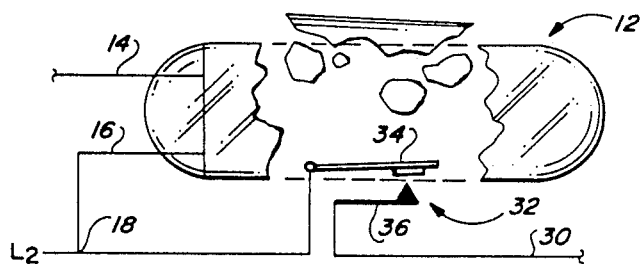

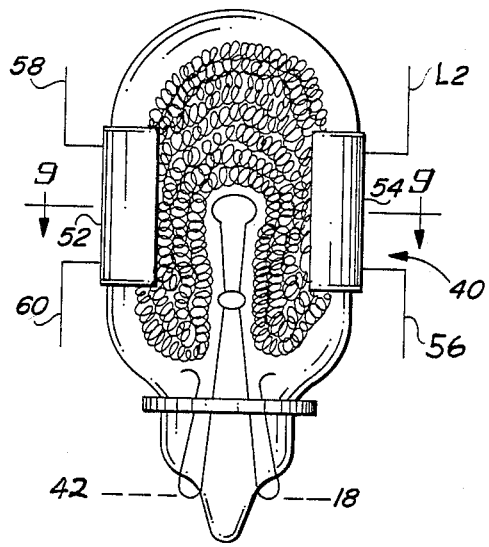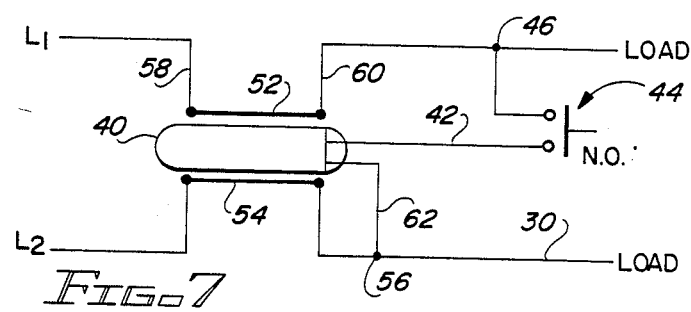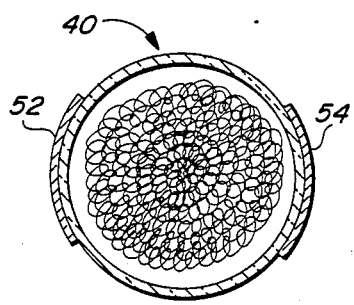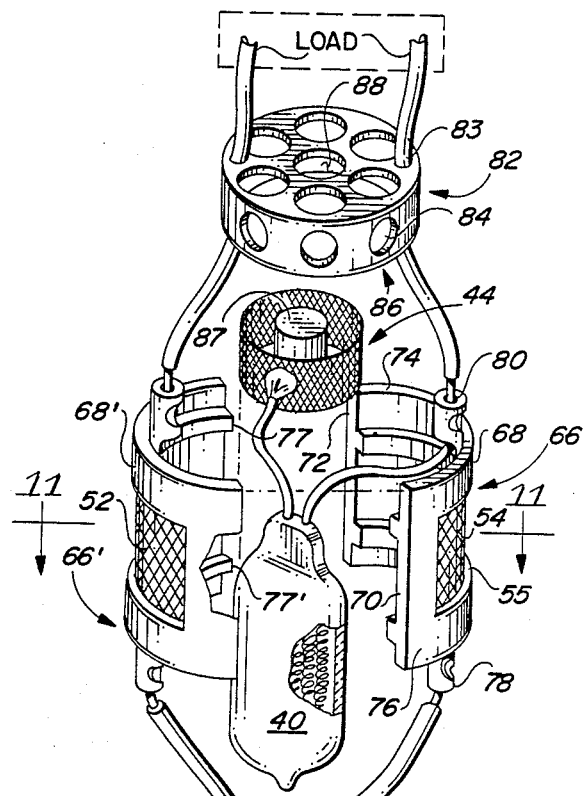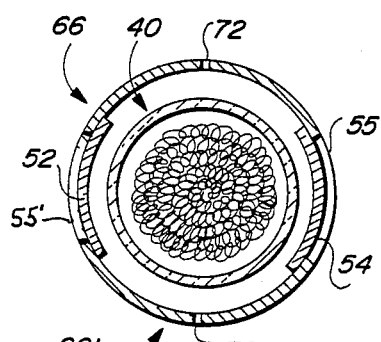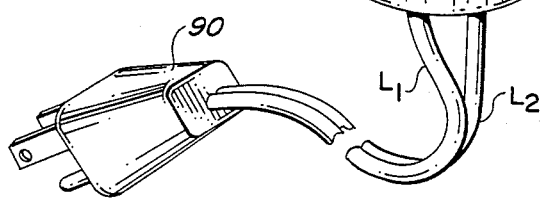

ELECTRICAL SWITCH AND CIRCUITRY FOR APPLIANCE

BACKGROUND OF THE INVENTION

There are many electrical devices used about the ordinary household which are subject to electrical shock hazards whenever the user of the device comes in contact with an electrical ground, as for example touching a water hydrant, accidentally submerging the device in water, or worse yet, providing circuitry through one's body due to malfunction of the insulation somewhere in the device.

Domestic appliances are connected to a supply of alternating current which flows 60 cycles per second and accordingly each 120th of a second delivers up to 120 volts of electrical shock to any person who may inadvertently come in contact with this power source. It is therefore logical that some sort of sensor device could be made to sense the malfunction during the first cycle of current flow and utilize the sensed condition for immediately disconnecting the device from the power souce. It is possible to make the response rate of such a device fast enough to preclude a person from realizing that he has received an electrical shock.

Such a safety apparatus should be simple in design so as to be economically feasible for use in conjunction with inexpensive domestic appliances in order for the manufacture to maintain competitive prices. Accordingly, the present invention relates to an electrical device whose purpose is to prevent electrical shock hazards, especially in conjunction with small appliances. This invention is an active device which constantly monitors specific conditions which may be used to activate the device to remove the power source from a load, such as a domestic appliance, and thereby prevent electrical shock hazards and other physical electrical dangers such as fire. The method and apparatus of this invention differ from other types of electrical protection devices, such as fuses and circuit breakers, in several ways, as for example:

1. The device has a typical activation time of 50-300 microseconds;
2. The device activates on conditions other than short-circuits;
3. The device can be located in the appliance; and,
4. The device can be made to activate in response to either current or voltage sensing.

SUMMARY OF THE INVENTION

This invention disconnects a load from a power source in response to a predetermined signal, such as a change in the current or voltage for example, connected to the load. A normally closed switch means connects the load to the power source. A frangible or breakable device includes destructive means associated therewith which shatters or fragments the device when actuated. The destructive means is actuated in response to a predetermined condition being sensed by an appropriate sensor means. The normally closed switch means is opened in response to the frangible device being fragmented by the destructive means, thereby interrupting current flow to the load.

In the first embodiment of the invention, a small neon lamp is employed as the frangible device. The neon lamp is series connected to a suitable ballast. Means are provided for exploding the neon lamp by short-circuiting the ballast whenever the predetermined condition is encountered, such as for example, the occurrence of a predetermined change in the current or voltage flowing to a load. A normally closed switch means is arranged to be opened in response to destruction of the neon lamp envelope. The normally closed switch means is connected between the load and a power source. A sensor apparatus detects the current or voltage change of the system and causes the ballast to be short-circuited, thereby exploding the neon lamp and moving the normally closed switch to the open position, whereupon the load is removed from the power source almost instantaneously.

In a second embodiment of this invention, a small flash bulb is employed as the frangible device. The flash bulb envelope does not have the usual protective coating applied to the glass envelope thereof and consequently the envelope shatters when the combustible material contained therein is activated or "flashed". Sensor means are connected to activate the flash bulb in response to a predetermined condition being realized.

A normally closed switch means connects the load to a power source, and is moved to the open position in response to destruction of the envelope, thereby interrupting current flow with an unexpected rapid response rate.

In a more specific embodiment of this invention, a small flash bulb is captured within a housing. Windows formed through the housing are closed by a breakable sheet of metal which forms a switch means. The sensor is a conductive member arranged to be grounded upon contact with water, whereupon current flows to the flashbulb detonator and explodes the flash bulb which breaks the sheet of metal and thereby removes the load from the power source.

Accordingly, a primary object of the present invention is to provide an improved electrical safety device for the protection of persons and things from the hazards of shock and the dangers associated with excessive current draw of electrical apparatus.

Another particular object of the present invention is to provide electrical circuitry for the detection and removal of a condition before the condition becomes dangerous.

A further object of this invention is to provide an electrical switch means having faster action than can generally be expected from alternative devices.

Another and further object of the present invention is the provision of an active device which constantly monitors specific conditions which may be used to activate the device and thereby remove power from a load, such as a domestic appliance.

A still further object of the present invention is the provision of method and apparatus by which a switch means is moved to an alternate position in response to the destruction of a breakable body associated with the switch means, with the destruction of the body occurring in response to a predetermined condition of operation.

The above objects of the present invention are attained by the provision of a normally closed switch means which connects a load to a power source, with there being a frangible device having destructive means associated therewith which fragments the device in response to a predetermined condition being sensed by the destructive means, whereupon the normally closed switch means moves to the open position in response to the frangible device being fragmented by the destructive means, thereby interrupting current flow to the load.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above summary.

BRIEF DESCRIPTION OF THE DRAWINGS

FIG. 1 is a schematical view of circuitry which sets forth one embodiment of the present invention;

FIG. 2 is an enlarged, cross-sectional view taken along line 2—2 of FIG. 1;

FIG. 3 is an enlarged, detailed view of part of the apparatus disclosed in FIG. 1, with the apparatus being shown in the activated configuration;

FIG. 4 is a schematical view of circuitry, similar to the circuitry of FIG. 1, which sets forth a modification of the embodiment of FIG. 1;

FIG. 5 is an enlarged, detailed view of part of the apparatus disclosed in FIG. 4, with the apparatus being shown in a dynamic state;

FIGS. 6 and 6A show schematical views which sets forth circuitry made in accordance with another embodiment of the present invention;

FIG. 7 is a schematical view of circuitry, similar to FIG. 6, which sets forth still another embodiment of the present invention;

FIG. 8 is an enlarged, detailed, elevational view of part of the apparatus disclosed in FIGS. 6 and 7;

FIG. 9 is a cross-sectional view taken along line 9—9 of FIG. 8;

FIG. 10 is an enlarged, exploded, perspective view of apparatus made in accordance with one of the foregoing embodiments of the present invention; and, FIG. 11 is a cross-sectional view taken along line 11—11 of FIG. 10.

DETAILED DESCRIPTION OF THE PREFERRED EMBODIMENTS

Figure 6A:
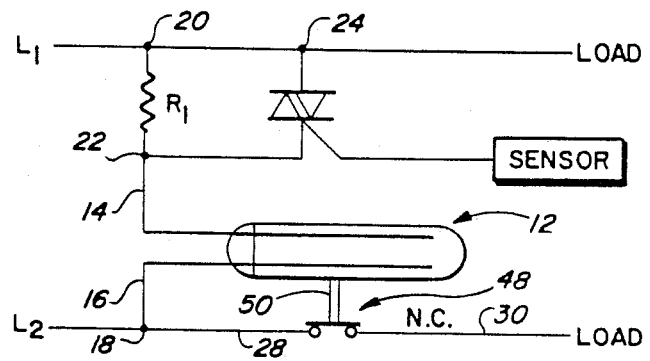

This invention relates to an electrical device whose purpose is to prevent electrical shock hazards, especially in conjunction with small electrical apparatus such as domestic appliances. As seen in FIGS. 1-11 of the drawings, the invention is an active device which constantly monitors specific conditions which may be used to activate the device to remove a power source from a load, and thereby prevent electrical shock hazards and other dangers from occurring.

In the specific embodiment of the invention 10 seen illustrated in FIG. 1, a load, which can be a hair dryer or other domestic appliance, is connected to a power supply which is the usual 120 volt conductors L1, L2. It is preferred that L1 be the grounded side of the circuit when a domestic appliance is to be the load which is protected by the illustrated circuit. The line L2 is therefore the usual 120 volt "hot" conduit leading from a wall plug or the like.

A neon lamp bulb 12, preferably a small lamp having the usual electrodes, is filled with an appropriate gas which is contained within the illustrated glass envelope. Conductors 14, 16 are connected to the neon lamp electrodes so that current is available to the lamp at junction 18. Junction 20 is connected to a suitable neon lamp ballast R1, known to those skilled in the art, and to conductor 14 at junction 22 so that when current is applied across L1, L2, the neon lamp is activated.

A triac 23, as for example Sylvania ECG 5651 is connected between junctions 22 and 24. The triac has the gate thereof connected to the illustrated sensor. When a high or low resistant contact is made between either line L1, L2 and the sensor contact lead, the ballast resistor R1 is effectively removed from the circuit causing the neon bulb to draw excessive current and subsequently explode the glass envelope thereof. The triac is triggered on both halves of the cycle.

In the embodiment of FIGS. 1-3, the glass envelope is provided with a strip of conductive material 26, as for example a strip of alluminum or lead applied externally of the glass envelope in the illustrated manner of FIGS. 2 and 3. Conductors 28 and 30 are attached to opposed marginal ends of the strip of metal 26 so that when the neon lamp 12 explodes, the metal strip is torn or fragmented as indicated by numerals 26′, whereupon the load is removed from the power source.

In the modification of the invention set forth in FIGS. 4 and 5, a normally closed switch 32 having contacts 34 and 36 are placed respective to the glass envelope of the neon lamp 12 whereby the two contacts 34, 36 are forced into the normally closed position (FIG. 4) so that current is conducted from L2 to conductor 28, to conductor 30, and to the load.

In FIG. 5, the switch means 32 has been moved to the open or alternate position due to fragmentation of the glass envelope. As seen in FIG. 5, switch contact 34 has been moved away from switch contact 36 and current no longer flows through the opened circuitry.

In some instances, it will be desirable to utilize two metal strips 26 placed in spaced relationship on opposed sides of the glass envelope in order to provide a switch means in each of the lines L1 and L2, as set forth in FIGS. 7-11, for example.

In the embodiment of the invention set forth in FIG. 6, there is disclosed a frangible body or breakable device 40 in the form of a flash bulb, such as used in photography. Destructive means in the form of the usual combustible material is enclosed within the frangible glass envelope of the flash bulb, as suggested in FIGS. 8 and 9. The protective plastic layer or usual coating of material has been removed from the surface of the flash bulb to assure fragmentation upon detonation. The combustible material is detonated in response to the illustrated filament (FIG. 8) being properly electrically energized.

The filament of the flash bulb 40 is connected to electrical conductor 42 which is connected to a sensor 44. The sensor 44 can take on several different forms but preferably is in the form of a normally open switch means. The switch means is connected at junction 46 to complete the circuit to L1.

A normally closed switch means 48 connects a load to the line L2 by means of conductor 30 and 31. The other side of the flash bulb filament is connected to junction 18. Means 50 associated with the normally closed switch 48 and the flash bulb 40 maintain the normally closed switch 48 in the closed position. Destruction of the glass envelope of the flash bulb 40 removes means 50 and causes switch 48 to assume the normally open configuration.

The means 50 can be a plastic member or most any intervening object including a bent switchblade placed adjacent to the glass envelope which is removed upon explosion of the bulb.

FIGS. 7-9 illustrate an alternate embodiment of the present invention, wherein opposed strips of metal 52, 54 are applied to the exterior of the glass envelope and form the normally closed switch means for use in each of the lines L1, L2 between the source of power and the load. The flash bulb 40 is connected to the before mentioned sensor 44 at junctions 46 and 56. Numeral 58 indicates a conductor leading to leg L1 of the power source L1 and L2.

The closure or normally open switch 44 initiates combustion of the flash bulb 40 which immediately explodes, thereby destroying the metal strips 52, 54 so that current cannot flow therethrough, and thereby removes the load from the power source. The conductive strips 52, 54 are shown supported on the exterior of the envelope of bulb 40, and it would be within the comprehension of this invention to place the strips 52, 54 within the envelope, proper precautions being taken to insulate the strips from one another and from the combustible metal.

FIGS. 10 and 11 set forth a more detailed embodiment of the present invention. As illustrated in FIGS. 10 and 11, a cylindrical body made of members 66, 66', preferably made of nonconductive plastic, jointly form a cylinder of limited length when brought together in the illustrated manner of FIG. 11. Each half 66, 66' of the cylinder has opposed longitudinal edges 70, 72 and opposed ends 74, 76. Numerals 77, 77' illustrate spaced circumferentially extending ribs formed interiorly of the cylindrical shell. Terminals 78, 80 are supported by each of the cylindrical shells, and are electrically attached to the illustrated lead strips 52 and 54. The lead strips are each positioned within one of the illustrated windows 55. The lead strips can be ribbed, as shown, or smooth as may be desired.

The small flash bulb 40 is captured within the two cylindrical shells and between the ribs 77, 77'. A relatively large diameter cylindrical member 82 is provided with an apertured sidewall and an apertured top wall. Opposed apertures, one being indicated by numeral 83, receives the load wires therethrough. Aperture 84 is one of a plurality of large ports through which fluid can flow. The arrow at numeral 86 indicates that cap 82 is downwardly opening.

Sensor 44 can take on a number of different forms so long as it is an electrical conductor attached to the appropriate filament of the flash bulb 40. The sensor 44 can be provided with the illustrated central standard 87 by which the assembly 44 can be attached to aperture 88 by means of a fastener, including cementatious or adhesive material.

An upwardly opening cup member 64 receives a power source L1, L2 through the illustrated small apertures, one being indicated by numeral 65. The cup member 64 can be made of plastic and is of and inside diameter that permits the interior thereof to slidably receive the assembled cylindrical plastic main body 66 therewithin. The inverted plastic cap 82 is of a size and configuration to receive the upper marginal end of member 64 therewithin. The assembled apparatus can be placed within the appliance, or alternatively placed within the power line in the illustrated manner of FIG. 10. It is also possible to place the assembled apparatus within a small black box having an ordinary 110 volt plug 90 affixed thereto, in a manner such as is associated with small battery chargers, and extend the sensor conductor to any desired location.

The term "filament" as used in this disclosure is intended to include the detonation means of a modern flash bulb which is designed to operate at very low voltages and rapidly initiates the combustibles contained within the flash bulb envelope. These "filaments" or initiators are specially coated with electrically responsive explosive-like material which causes the combustibles within the bulb to "flash" almost instantaneously upon the application of a small difference in potential from a suitable power source. Hence, the response rate of the modern flash bulb is incredibly fast, and when actuated, it senses and triggers at a voltage level similar to the before mentioned triac.

OPERATION

The general principle of operation of a device made in accordance with the present invention depends upon the use of a small neon lamp 12. These lamps produce light through the interaction of neon gas and the two illustrated electrodes connected at 14 and 16 in FIG. 1. There are three specific characteristics of neon lamps which are of importance to this invention:

1. The electrical resistance across the lamp before ionization (breakdown voltage) is achieved is extremely high.

2. After ionization the electrical resistance across the lamp drops very low.

3. A neon lamp requires ballasting in the form of some kind of resistance to limit current flow through the lamp, or it will develop excessive thermal gas pressure and destroy itself by exploding the glass envelope.

These are the special qualities of the neon lamp used to advantage in this invention to achieve the device action. FIGS. 1 and 4 show the basic circuit arrangement of the device. A neon lamp is placed across the power lines L1, L2 in series with a suitable ballast resistor R1 to prevent operation damage. A sensing lead is placed as illustrated respective to the resistor, either alone or in conjunction with a solid-state triac device used to improve overall device sensitivity. When a high or low resistance contact is made between either line and the sensor contact lead, the ballast resistor is effectively removed from the circuit. The neon bulb draws excessive current for approximately 50–100 microseconds by which time the thermal gas pressure inside the glass bulb is great enough to explode the glass envelope. The physical presence of this glass envelope is used to support an electrical contact 26 or 32 in the main line 28 or 30. The destruction of glass envelope 12 eliminates the physical support of contacts 26 or 32 and the line current is interrupted. It is to be understood that the method of utilizing the glass envelope as a switching device is not restricted to supporting contacts. FIG. 1 shows an alternative method of applying a conductive film to the surface of the glass envelope in order to effect the switching action while FIG. 4 discloses a switch device arranged to be moved to the alternate position upon fragmentation of the lamp.

The general principle of the device set forth in FIGS. 6-11 depends upon the use of a small flash bulb, such as seen illustrated in FIG. 8. These lamps produce light by the combustion of a coil of aluminum-magnesium wire or zirconium wire with oxygen. An electric current causes a tungsten filament to glow and ignite the metal wire coil. The oxygen atmosphere filling the bulb causes an explosion-like combustion process which causes excessive thermal expansion and shatters the glass bulb envelope.

There are two specific characteristics of flash bulbs which are of importance to this invention:

1. The electrical resistance across the lamp filament before ignition is relatively low.

2. The explosive combustion of the wire in oxygen atmosphere produces excessive thermal gas pressure and destroys the glass envelope.

These are the special qualities of the flash bulb used to advantage in the invention to achieve the device action. FIGS. 6 and 7 show the basic circuit arrangement of the device. A flash bulb 40 is placed across the power lines L1, L2 in series with a suitable sensing switch 44 to prevent operation until the desired condition occurs. When the sensing switch closes, the flash bulb ignites, and approximately thirty microseconds later the thermal gas pressure inside bulb 40 is great enough to explode the glass envelope.

The physical presence of this glass envelope is used to support an electrical contact located in series with the main power line. Destruction of the glass envelope eliminates the physical support of the contact and the line current is interrupted.

FIGS. 10 and 11 show a typical application of the device as a circuit interrupt device.

In FIG. 10, L2 is connected to terminal 80 and therefore must be the "hot" or above ground terminal, while L1 is the grounded or neutral side of the circuitry.

The safety device of FIG. 10 preferably is housed within an appliance. Should the appliance be submerged in water, sensor 44 wil conduct, or form a current flow path through the water and detonate or "flash" the flash bulb 40. The resultant force of the exploding bulb impacts against both the opposed metal conductive strips 52 and 54, and fragments the strips or blows the strips from the window 55, so that current no longer flows to the load.

In pursuance of the above objects, the invention sets forth a novel process and arrangement for preventing electrical shock and protecting against other electrical hazards.

I claim:

1. Apparatus for disconnecting a power source from an appliance, comprising:
   a normally closed switch means for connecting an appliance to a power source; means forming a breakable enclosure that can be fragmented; detonator means connected to cause said breakable enclosure to be fragmented when actuated; sensor means connected to actuate said detonator means in response to fault current flow;
   said enclosure is distinct from said switch means and holds said switch means closed until said detonator means is actuated by said sensor means to thereby move said switch means to the open position whereupon current flow through said switch means is interrupted.

2. The apparatus of claim 1 wherein said breakable enclosure is a neon bulb, circuit means by which said bulb is connected to a suitable ballast, said sensor means short circuits said ballast when actuated, thereby fragmenting said neon bulb, and moving the switch means to the open configuration.

3. The apparatus of claim 1 wherein said breakable enclosure includes a flash bulb, circuit means by which said sensor means is connected to cause detonation of said flash bulb in response to fault current flow.

4. The apparatus of claim 1 wherein said breakable enclosure is a continuous frangible envelop having said detonator means contained therewithin for exploding said enclosure into fragments when the detonator means contained therein is detonated.

5. An electrical device connected directly to a hand held domestic appliance for discontinuing the flow of electrical power to the domestic appliance, said device comprising:
   circuit means, including a switch means, for connecting the appliance to a power source; said switch means can be moved from a conducting into a non-conducting configuration;
   a frangible body; means, including a detonator, for exploding said frangible body; means by which said switch means is actuated from the conducting into the non-conducting configuration in response to said frangible body being exploded; said switch means is distinct from said frangible body;
   and a sensor means connected to actuate said detonator in response to a fault current flowing at said switch means.

6. The device of claim 5 wherein said frangible body is a neon bulb, circuit means including a ballast connecting the bulb to a source of power, said sensor means being connected to short circuit said ballast when said sensor means senses the flow of fault current.

7. The device of claim 5 wherein said frangible body is a flash bulb; said means including a detonator includes combustible material contained within the bulb and a bulb filament; circuit means connecting said filament to receive the flow of fault current which detonates the flash bulb when the current flow reaches the required magnitude.

8. The device of claim 5 wherein said frangible body is a hermetically sealed enclosure which biases said switch means into the closed position until the body is fragmented, whereupon said switch means is moved to the open position.

9. Apparatus for electrical shock hazard protection by disconnecting a power source from a portable appliance, whenever the appliance is immersed in water comprising:
   switch means for disconnecting the appliance from a power source; a neon bulb, circuit means by which said bulb is connected to a suitable ballast; sensor means for sensing fault current and short circuiting said ballast when said fault current is sensed, thereby causing said neon bulb to be fragmented;
   said switch means being connected to be actuated to the open position in response to fragmentation of said neon bulb.

10. Apparatus for shock hazard protection by disconnecting a portable appliance from a power source whenever the appliance is immersed in water, comprising;
   switch means for disconnecting the appliance from a power source; a flash bulb having an envelop which becomes fragmented when the flash bulb is detonated;
   sensor means for sensing fault current flow from said switch means to ground, said sensor means being connected for detonating said flash bulb in response to the fault current flow;
   means by which said switch means disconnects the portable appliance from a power source in response to fragmentation of said flash bulb; whereby, when said portable appliance is brought into contact with water to cause a fault current to flow, said sensor means detects the fault current and causes the flash bulb to detonate and thereby fragment the envelop thereof, whereupon said switch means assumes the non-conducting configuration and disconnects said portable appliance from a power source.

11. Method of disconnecting a load from a power source in response to a fault current flowing between the load and ground, comprising the steps of:
   connecting a switch means between the load and the power source and flowing current from the source, through the switch means, and to the load;
   mounting a frangible device adjacent to said switch means with said frangible device holding said switch means in the conducting configuration;
   selecting a destructive means having the capability of fragmenting said frangible device sufficiently to cause said switch means to assume the non-conducting configuration;
   connecting circuit means and a fault current sensor means to cause said destructive means to fragment said frangible device upon a fault current flowing from said switch means.

12. The method of claim 11 and further including the step of using a neon bulb for said frangible device; and,
   connecting a ballast to said neon bulb and providing circuitry by which the neon bulb is energized;
   using said sensor means for short-circuiting said ballast when a fault current is sensed, thereby fragmenting the neon bulb, and removing the power from the load.

13. The method of claim 11 and further including the step of using a flash bulb for said frangible device; and, using said sensor means to connect the flash bulb to a power source whenever said sensor means senses a fault current flow;
   whereupon, the flash bulb is fragmented and power is removed from the load whenever the fault current commences to flow.

14. The method of claim 13 and further including the steps of placing a conductive strip of material adjacent to the envelop of said flash bulb and using said conductive strip of material as said switch means;
   making said strip of material into a configuration whereby it is fragmented upon fragmentation of said flash bulb.

15. The method of claim 13 and further including the steps of enclosing said flashbulb within a housing;
   forming a window through said housing;
   supporting said conductive strip within said window;
   and, arranging the flashbulb window, and conductive strip whereby fragmentation of the flashbulb causes the conductive strip to be forced into a non-conductive configuration.

16. The method of claim 11 and further including the step of using the envelop of a glass bulb for said frangible device;
   said destructive means being explosive material that is contained within the envelop; there being an electrical initiator for said explosive material which can react and fragment the envelop;
   using said sensor means to connect the initiator to a power source whenever said sensor detects a fault current from immersion of the sensor in water;
   whereby, when the envelop is fragmented, the switch means is moved to the non-conducting configuration, and power is removed from the load.

17. The method of claim 11 and further including the step of using an envelop of a flashbulb for said frangible device.

* * * * *